July 24, 1923.
W. S. CLOUD
1,462,883
PROCESS AND APPARATUS FOR MAKING CONFECTIONS
Filed May 2, 1923
3 Sheets-Sheet 1
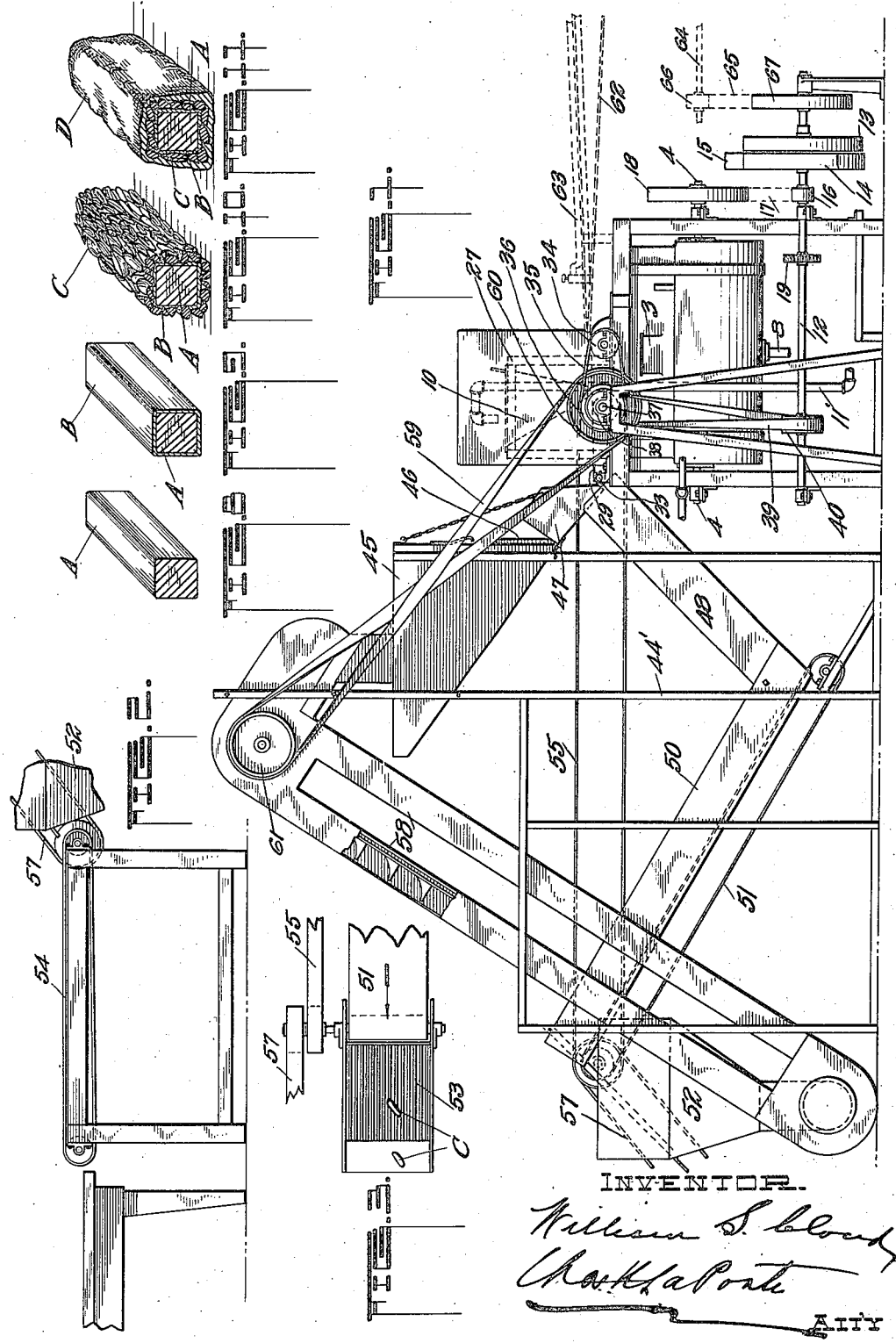

July 24, 1923.
W. S. CLOUD
1,462,883
PROCESS AND APPARATUS FOR MAKING CONFECTIONS
Filed May 2, 1923
3 Sheets-Sheet 2
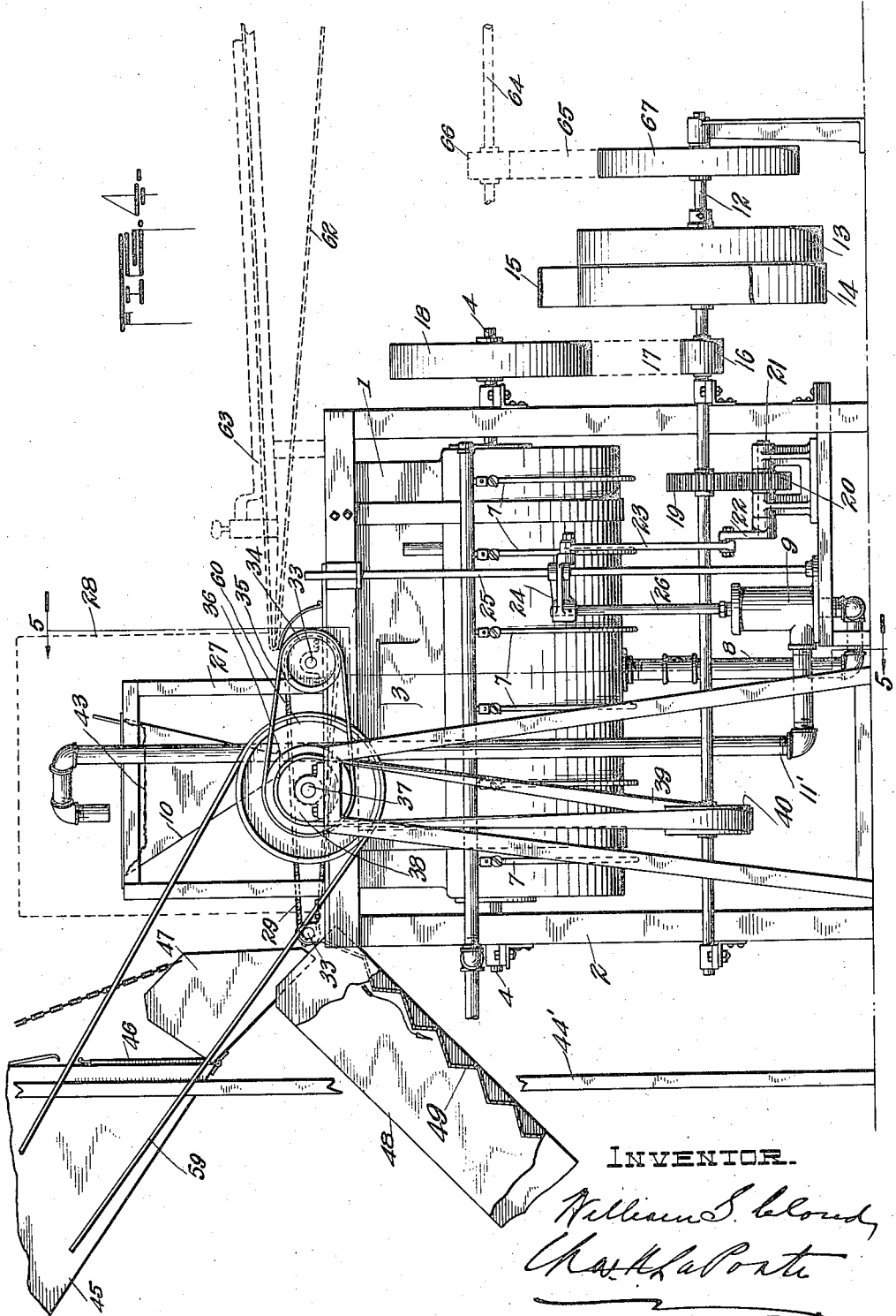
INVENTOR.
William S. Cloud
Chas. H. LaPorte
ATTY

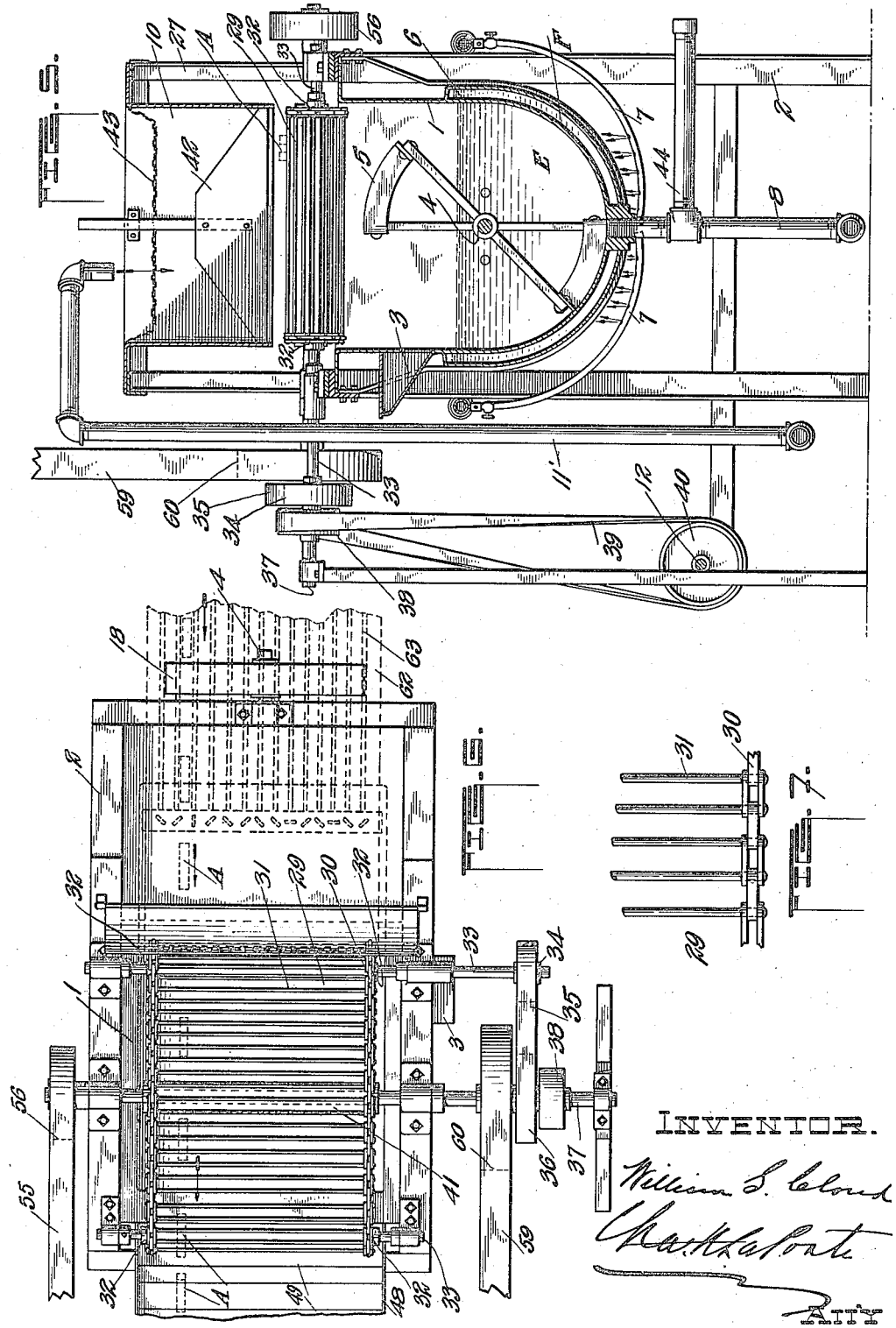

Patented July 24, 1923.

1,462,883

UNITED STATES PATENT OFFICE.

WILLIAM S. CLOUD, OF PEORIA, ILLINOIS, ASSIGNOR TO JAMES D. ROSZELL, OF PEORIA, ILLINOIS.

PROCESS AND APPARATUS FOR MAKING CONFECTIONS.

Application filed May 2, 1923. Serial No. 636,071.  REISSUED

*To all whom it may concern:*

Be it known that I, WILLIAM S. CLOUD, a citizen of the United States, a resident of Peoria, in the county of Peoria and State of Illinois, have invented new and useful Improvements in Processes and Apparatus for Making Confections, of which the following is a specification.

This invention has reference to a process and apparatus for making confections.

There are certain types of confections, which are now and for sometime have been very popular, such for instance as "Milk-nut roll"—"Pecan roll"—"Cocoanut roll"—
"Raisin roll" and the like; all preferably made with a suitable center covered with caramel or other material, the nuts or raisins, with a finishing coating of chocolate, if desired. So far as I am aware all such confections have been made by hand, or hand dipped, which is both inconvenient and expensive, making it difficult to produce the article in a five-cent piece, which has proven to be the most desirable, from a sales viewpoint. These pieces have a certain specified weight and it is therefore obvious that control must be had of each of the component parts of the piece and that weights of the ingredients and temperatures of the coverings, such as caramel and chocolate enter largely into the ultimate cost of the finished article. Hand-dipping requires not only a cooling room adequate for the number of employees necessary, together with a large number of expensive scales to weigh the individual pieces, but because of the difficulty experienced in handling the caramel and the dipping of the individual centers therein and removal of the same, which practically prevents the control of the heat of the caramel, it has proven difficult to produce by hand dipping an inexpensive piece. By the use of my process and apparatus, the cooling room and scales for weighing the individual pieces, as they are covered with nuts, cocoanut or raisins have been eliminated; the temperaure of the caramel controlled, and the covering of the caramel coated centers uniformly covered with nuts, cocoanut or raisins, so that all the articles are made substantially alike and substantially the same weight. Furthermore, handling of the pieces by hand is to a large extent done away with and production is increased many, many times.

My invention comprehends an apparatus for enrobing or covering the candy centers with plastic material such as caramel, fondant or icing and then passing the coated or enrobed centers through a shower of units of suitable materials, such for instance as nuts, cocoanut, raisins or the like which will adhere to the coating as the same comes into contact therewith; the articles being caused to move with the surplus nuts, cocoanut, raisins or the like and to be tumbled about so that the entire coated surface of the articles shall be covered. The finished or semi-finished articles, as the case may be, being conveyed from the apparatus, and the surplus and unused nuts, cocoanut, raisins or the like conveyed to a point for a re-showering of further centers. The process being continuously carried on, as will be inferred. By the use of the terms "finished" or "semi-finished", articles, I mean articles which are finished with a covering of nuts, cocoanut, raisins or the like, or after the nuts, cocoanut, raisins or the like have been put on, then covered with a finishing coating or covering of chocolate. I have not shown nor do I include the chocolate finishing step, as it forms no part of this invention, being done by the ordinary and well known enrobing machines used by manufacturers of candies and confections for many years.

That the invention may be more fully understood, reference is had to the accompanying drawings, forming a part of this application, illustrating a preferred embodiment of apparatus, in which:—

Figure 1 is a side elevation of an apparatus embodying my invention, suitable for the carrying out of my improved process, parts being broken away, and the feeding means to the caramel coating or covering means, being partly shown in dotted lines;

Figure 2 is a side elevation of a part of the apparatus and would extend from the left hand end of Figure 1;

Figure 3 is a partial plan view of the delivery end of Figure 1;

Figure 4 is a detail in side elevation of the caramel coating means, nut, cocoanut or raisin delivering means and tumbling means;

Figure 5 is a vertical sectional view, as the same would appear on the line 5—5 Figure 4, with the feeder or distributing hopper for the caramel in section;

Figure 6 is a detail in plan showing the conveyer for the candy centers, located below the caramel distributing hopper;

Figure 7 is a detail of the conveyer shown in Figure 6;

Figures 8, 9, 10 and 11 show respectively, in detail and in section, the candy center, as coated with caramel, as covered with nuts and then covered with a chocolate covering.

Like characters of reference denote corresponding parts throughout the figures.

To a full and complete understanding of the use of the process and apparatus, reference will be first made to the confection to be produced. In Figure 8 there is shown a candy center or core A, which may be soft, semi-hard or hard, as may be desirable. This core forms the base to be covered with caramel, then nuts, cocoanut or raisins, and finally covered with a coating of chocolate, if desired. Figure 9 shows the core A, enrobed or covered with a caramel coating B. Figure 10 shows the caramel coated core or center coated with nuts C. Ordinarily the pieces are made with peanuts and the final article covered, coated or enrobed with a chocolate coating D. Such an article is then sold as a "Milk-nut roll." Instead of peanuts, pecans, raisins or cocoanut could be used. Usually when the caramel coated core is covered with pecans, the article is sold as a "Pecan-roll" without the final chocolate covering. It should therefore, be apparent that the character of the finished confection may vary in accordance with the wishes of the manufacturer and demands of the trade.

In the drawings, the caramel E is contained within a jacketed heated tank or receptacle 1, supported by a suitable frame work 2, an inlet 3 being provided on the tank through which the caramel is poured into the tank. Said tank has preferably a round bottom, and revoluble in the tank on a shaft 4, is an agitator scraper 5 adapted to keep the caramel in agitation and scraped from the wall of the tank, so that all of the caramel may be uniformily heated and kept in the desired liquid state and temperature. Within the jacket 6 of the tank is oil F, heated by suitable burners 7 supplied with fuel from a suitable source of supply. Said burners heat the oil and in this manner uniformly apply heat to the wall of the tank to heat the caramel. Caramel coating is much thicker and stickier than chocolate and therefore much harder to handle, but very easily and conveniently handled by the means herein described, and also very easily controlled. A feed pipe 8 leads from the bottom of the tank 1 to a suitable pump 9, and connected with said pump and leading to a feeder or distributing hopper 10 is a feed pipe 11. The pump, which draws the heated caramel from the tank 1 and pumps it to the hopper 10 is operated as follows: 12 designates a driving shaft having a tight and loose pulley wheel 13 and 14 thereon to be connected by a belt 15 leading to a suitable source of power. To said shaft is connected a small pulley wheel 16 operating a belt 17 driving a larger pulley wheel 18 on the agitator scraper shaft 4 in the tank 1. Also on said shaft 12 is secured a gear wheel 19 meshing with a gear wheel 20 carried on a shaft 21 to which is connected a crank 22 connected with a pitman bar or rod 23, in turn connected to a cross-head 24 movable up and down on a guide-rod 25. And to the cross-head 24 is connected the pump actuating rod 26, see Figure 4.

The feeder or distributing hopper 10 for the caramel is preferably suspended from a super-structure 27, located above and at the inner end of the frame 2 within which is supported the tank 1, and said hopper 10 and structure 27 may be enclosed or covered by a removable frame-covering 28. Below the hopper 10 and above the open upper portion of the tank 1 is a conveyer 29, best seen in Figures 5 and 6. Said conveyer preferably lies above the rear half portion of the tank 1, as shown. I prefer to construct the conveyer 29 in the manner shown in Figures 6 and 7. It includes preferably, the endless side chains 30 connected by the transversely disposed rods 31 spaced at suitable distances apart and on which rest and are moved the candy centers or cores A, as shown in dotted lines in Figure 6. The opposite chains 30 travel over sprocket wheels 32 carried on a driving shaft 33 at the front end and shafts 33' at the rear end. On the shaft 33 is carried a pulley wheel 34 operated by a belt 35 from a pulley wheel 36 on a cross-shaft 37 to which is secured a pulley wheel 38 operated by a belt 39 from a pulley wheel 40 on the driving shaft 12. It is to be observed that the shafts 33' do not cross within the conveyer 29, but that the shaft 37 does, it being preferably located approximately midway the length of the conveyer 29 and just to the rear of the lower discharge end of the hopper 10, see Figure 4. On the shaft 37 is a roller or drum 41 with which the upper run of the conveyer rods 38 contact. It is desirable and important that there be no obstructions within the conveyer 29, at the rear end, which would be the case if the shafts 33' were carried through. This prevents carriers for the caramel and does away with obstructions which would otherwise prevent a free drip of the surplus caramel back into the tank 1. Also the drum or roller 41 midway the conveyer and just to the rear of the lower discharge end of the hopper 10 will catch the drip of the caramel and provide for the complete enrobing of the candy centers or cores A as they are moved beneath the hopper 10 and across the drum or roller 41. The rear or discharge end of the conveyer 29 is at the rear end of the tank 1 and frame 2, see Figure 4.

The conveyer structure 29 and its location in relation to the tank 1 is somewhat similar to like structures in well known types of candy enrobing machines, except that the present conveyer is more of an open type, as explained, and it travels faster so as to insure a complete throw-off of the caramel coated centers or covers where they pass through the shower of nuts, cocoanut or raisins into the tumbler.

The feeder or distributing hopper 10 lies above and across the full width of the conveyer 29, see Figure 5 and is provided with a controllable shutter 42 adjustable up and down on the inside of the front wall of said hopper 10, to control the flow of the caramel therefrom, discharged thereinto from the feed pipe 11. Said hopper is further provided with a screen 43, at or near its upper end through which the caramel must pass into the hopper and is for the purpose of intercepting heavy particles and extraneous matter which might clog or tend to clog the outlet at the bottom of the hopper, controlled by the shutter 42. A drain pipe 44 for the tank 1 is provided connected with the pipe 8, see Figure 5.

44′ designates a frame work in which is supported a hopper 45 having a valve regulated outlet 46, and adjustably suspended in front of said hopper and adapted to receive and direct the discharge of materials therefrom, is a spout 47. The discharge end of said spout is adjustable across the path of discharge of the caramel coated centers or cores A from the conveyer 29 as they are fed to the tumbler chute or conveyer 48 supported at an inclination downwardly and rearwardly from the discharge end of the conveyer 29, see Figures 1 and 4. The hopper 45 contains the nuts, cocoanuts, raisins or the like, providing the covering for the caramel coated centers A, and when the valve 46 is raised the materials are fed by gravity from the hopper 45 into the chute 47 and from the chute into the upper end of the tumbler chute or conveyer 48. The bottom of the latter is stepped, as shown at 49, Figure 4, whereby as the caramel coated centers A after passing through the shower of material discharged from the spout 47 will tumble and turn, at the same time move in the direction of the flow of the material through the chute or conveyer and insure the material adhering to the exposed caramel surfaces of the centers, not covered as said centers pass through the shower of material from the spout 47. Connected to the lower end of the chute or conveyer 48 is an upwardly inclined chute 50 through which moves an endless conveyer 51. This conveyer receives the materials flowing down through the chute 48, as well as the covered caramel coated centers, in which the latter tend to roll as they are conveyed to the upper end of the chute 50 and further insure a complete covering of the exposed caramel surfaces of the centers. Between the shower of material from the spout 47 and the passage of the caramel coated centers in the tumbler 48, and as they are conveyed upwardly through the chute 50 it will be apparent that all the exposed surfaces of the caramel coated centers will collect materials for covering. At the discharge end of the chute 50 is a hopper 52 covered by a grid 53, see Figure 3. The covered centers and surplus material from the conveyer 51 will be discharged onto this grid, the materials passing through the grid into the hopper and the covered centers passing over the grid and being discharged onto the conveyer table 54, see Figure 2, or like member, by means of which the "finished" or "semi-finished" articles, as the case may be, may be delivered to a desirable point. If the covered articles are to be enrobed or coated with a coating of chocolate, they will be passed from the conveyer table to a suitable enrobing machine. The conveyer 51 is operated by a belt 55 from a pulley wheel 56 on the cross-shaft 37, see Figure 6 and the conveyer table 54 is operated from the belt 55 through a belt 57 arranged and operated in the manner seen in Figures 1, 2 and 3. I provide for the return of the surplus materials deposited in the hopper 52, to the hopper 45. This is accomplished through and by means of an endless cup elevator 58 arranged to receive the discharge of the material from the hopper 52 and convey it to and discharge the same into the hopper 45. Said cup conveyer being driven by a belt 59 operated by a pulley wheel 60 on the cross-shaft 37 and operating a pulley-wheel 61 connected to the head end of the cup elevator, see Figure 1.

The candy centers or cores A are delivered to the conveyer 29 of the apparatus by means of a well known type of conveyer 62, seen in dotted lines Figures 1, 4 and 6 overlying which are a plurality of adjustable guides 63, between which the centers are laid on the conveyer, see Figure 6 and conveyed endwise onto the conveyer 29; said centers being received cross-wise of the rods 38 of the conveyer, and conveyed endwise through the flow of the caramel from the hopper 10 and thrown-off of the conveyer endwise through the shower of material discharged from the spout 47. The conveyer 62 may be driven from the driving shaft 12 in any suitable manner through a shaft 64 operated by a belt 65 engaging a pulley wheel 66 operated by a pulley wheel 67 on said shaft 12. The shaft 64, pulley wheel 66 and belt 65 being shown in dotted lines in Figures 1 and 4.

The chutes 48 and 50, the hopper 52, grid 53 and cup elevator are all suitably supported from the frame work 44, as shown.

What I claim is:—

1. The process of coating candy centers and enveloping said coated centers with materials, which consists in continuously moving said centers and during such movement subjecting the same, first to a coating of plastic material to enrobe said centers and then without appreciably cooling enveloping said enrobed centers with a multiplicity of edible units.

2. The process of coating candy centers and enveloping said coated centers with materials, which consists in continuously moving said centers and during such movement subjecting the same, first to a coating of plastic material to enrobe said centers and then without appreciably cooling subjecting said enrobed centers to covering materials such as nuts and enveloping said enrobed centers with such materials.

3. The process of coating candy centers, which consists in continuously moving said centers and during such movement subjecting the same, first to a pre-heated plastic coating to enrobe said centers and as the centers are moved and without appreciably cooling applying to and enveloping the enrobed centers with a multiplicity of edible units.

4. The process of coating candy centers and enveloping said coated centers with materials, which consists in continuously moving said centers through a coating of plastic material to first enrobe said centers; thence through a shower of units of suitable materials partially enveloping said enrobed centers; thence moving and commingling said materials and enrobed centers to completely envelop said centers, and finally separating the enveloped centers from the surplus material during their movements.

5. The process of coating candy centers with materials, which consists in continuously moving said centers through a coating of plastic material to enrobe said centers; thence through a shower of units of suitable materials partially enveloping said enrobed centers; thence moving and commingling said materials and enrobed centers to completely envelop said centers, and finally separating the enveloped centers from the surplus materials during their movements and returning the surplus materials to the point of shower.

6. In an apparatus of the character described, in combination, means for moving candy centers, means for enrobing said centers with a coating of plastic material as they are moved, and means for enveloping the enrobed centers with a multiplicity of edible units during the movement of said centers.

7. In an apparatus of the character described, in combination, means for moving candy centers, means for enrobing said centers with a coating of plastic material as they are moved, and means for enveloping the enrobed centers with nuts, during the movement of said enrobed centers.

8. In an apparatus of the character described, in combination, means for moving candy centers, means for enrobing said centers with a coating of plastic material as they are moved; means for showering the enrobed centers with units of suitable materials and partially covering said enrobed centers therewith; means for moving and commingling the partially covered and enrobed centers and the material to completely envelop said centers with such material, and means for separating the enveloped centers from the surplus material.

9. In an apparatus of the character described, in combination, means for moving candy centers, means for enrobing said centers with a coating of plastic material as they are moved; means for showering said enrobed centers with units of suitable materials, during the movement of said centers and partially covering said enrobed centers with such materials; a tumbling means adapted to receive said showered centers and materials and to cause a commingling of the same to completely envelop said enrobed centers with such materials; means to separate the enveloped centers from the surplus materials, and means to convey the surplus materials from the point of separation of the enveloped centers to the showering means.

10. In an apparatus of the character described, in combination, means for supplying a pre-heated plastic material for enrobing candy centers, means for conveying said centers and enrobing the same with said pre-heated material as said centers are conveyed, means for supplying nuts to said enrobed centers, means for regulating said supply of nuts, means for commingling said enrobed centers and said nuts, whereby said materials will collect such nuts and envelop such enrobed centers, and means for separating said enveloped centers from the surplus nuts.

11. In an apparatus of the character described, in combination with a continuously operating coating means for enrobing sandy centers with a plastic material, of means for enveloping said enrobed centers with a multiplicity of edible units, and means to separate the enveloped centers and the surplus edible units.

12. In an apparatus of the character described, in combination with a continuously operating means for enrobing candy centers with plastic material, of means to convey said enrobed centers, means to supply nuts in the path of travel of said enrobed centers and to commingle the same during the conveying of said centers, during which period the nuts adhere to and completely envelop such enrobed centers, and means to separate the enveloped centers from the surplus nuts.

In witness whereof, I have hereunto affixed my hand this 24th day of April, 1923.

WILLIAM S. CLOUD.